United States Patent [19]
Harland et al.

[11] 3,874,241
[45] Apr. 1, 1975

[54] LIQUID-FILLED PRESSURE GAUGE
[75] Inventors: Philip W. Harland, Perkasie; Ralph D. Waite, Sellersville, both of Pa.
[73] Assignee: Ametek, Inc., New York, N.Y.
[22] Filed: Mar. 15, 1973
[21] Appl. No.: 341,735

[52] U.S. Cl. .................................. 73/416, 73/431
[51] Int. Cl. .............................................. G01l 7/04
[58] Field of Search ...... 73/416, 431; 251/319, 297; 220/44 R

[56] References Cited
UNITED STATES PATENTS
| | | | |
|---|---|---|---|
| 1,861,442 | 6/1932 | Hammerstein | 251/297 |
| 2,591,514 | 4/1952 | Courtot | 251/297 |
| 2,736,333 | 2/1956 | Handcox | 251/319 |
| 3,434,330 | 3/1969 | Ingham et al. | 73/416 |
| 3,701,284 | 10/1972 | DeMeyer | 73/416 |

Primary Examiner—Donald O. Woodiel
Attorney, Agent, or Firm—Smythe & Moore

[57] ABSTRACT

A liquid-filled gauge has a cylindrical casing with a spring relief valve positioned in the closed end wall of the casing. The cylindrical side wall is provided with an aperture for filling the casing with liquid and a plug is retained within said aperture before it is installed. The inner end of the plug is provided with spaced flanges which engage opposite edges of an opening formed in a lip within said casing to retain the plug in the shipping position and then in the operating position when the plug is inserted completely into the wall aperture.

9 Claims, 6 Drawing Figures

PATENTED APR 1 1975 3,874,241

LIQUID-FILLED PRESSURE GAUGE

The present invention relates to liquid-filled pressure gauges and, more particularly, to liquid-filled gauges having spring pressure relief valves and non-removable sealing plugs in the walls of the casings.

Pressure responsive gauges of the type employing a Bourdon tube within a casing with the Bourdon tube connected to an indicator movement have been widely used to indicate pressure. Where these gauges are used in highly corrosive atmospheres and in locations where severe vibrations and/or pressure pulsations are present, it has been known to fill these gauges with a liquid that will act as a damper, will lubricate the moving parts of the mechanism, and will function to isolate the gauge internals from the corrosive atmosphere.

Occasionally the Bourdon tube may rupture because of fatigue or because of being subjected to a pressure greater than its capacity. As a result, the rupture of the tube will allow pressure within the casing, and the pressure within the casing may become sufficiently great to explode the casing and cause injury to personnel and damage to equipment. It has thus been proposed to provide pressure responsive relief valves for such gauges to enable liquid and/or gas under pressure to become exhausted from the casing when the casing is subjected to a predetermined pressure limit.

The casing is generally filled with liquid through an aperture formed in the wall of the casing. After sealing, a threaded plug or the like is inserted in the aperture. However, under certain circumstances these plugs have become loosened and even have fallen out to cause some or all of the liquid to escape from the casing. Thus, the gauge is in an inoperative state when it arrives at the situs of its installation. Also, personnel who are unfamiliar with the valve may remove the plug and cause leakage of liquid or introduce impurities therein.

Under the present state of the art, liquid-filled gauges are supplied completely sealed so as to retain the filling during shipping. Pressure relief valves are usually incorporated, but they are necessarily set at some pressure higher than normal atmospheric pressure so that the filling will not be lost as the result of internal case pressure buildup due to changes in atmospheric pressure and temperature which might occur during shipment. Accordingly, even after the gauge is installed, pressure may increase within the case up to the value of the pressure relief valve setting, usually 5 p.s.i. to 10 p.s.i. This increase in case pressure directly affects the accuracy of the pressure gauge by an amount equal to the excess in case pressure over atmospheric pressure. While the case pressure may be limited by the pressure relief valve to 5 p.s.i., such represents a substantial error in low pressure gauges. For example, in a 0–15 p.s.i. liquid-filled pressure gauge, a case pressure of 5 p.s.i. in excess of atmospheric pressure will cause an error in indication of 33⅓ percent of the full scale value of the gauge, whereas its advertised accuracy is usually 3 percent of full scale. This situation can be avoided by providing a venting plug which is normally closed during shipment, but which can be readily opened once the gauge is installed so as to vent the interior of the case to atmospheric pressure. Some present state of the art liquid-filled gauges have pressure relief valves which are set at less than 5 p.s.i. However, in order to ship such gauges, the pressure relief valve must be closed or rendered inoperative during shipping. This constitutes a safety hazard since failure to open the valve after installation will result in an explosion of the case in the event the Bourdon tube ruptures so as to admit high pressure to the interior of the case.

One of the objects of the present invention is to provide a liquid-filled gauge having a pressure relief valve for safely venting pressure due to rupture of the pressure element.

Another object of the invention is to provide a liquid-filled gauge having a filling plug which is readily closed after the gauge is filled, but which is not readily opened so as to prevent inadvertent loss of fill, yet can be opened in the event refilling becomes necessary.

A further object of the invention is to provide a liquid-filled gauge which includes a convenient means to vent the gauge internals to the atmosphere after installation and which can be conveniently sealed during the initial shipment or resealed for subsequent shipment.

A still further object of the invention is to provide a liquid-filled gauge which includes a convenient means to vent the gauge internals to atmospheric pressure after installation, but which will not constitute a safety hazard should the installer fail to open a vent which was sealed for shipment prior to shipment.

According to one aspect of the present invention, a liquid-filled pressure gauge includes a casing which may be cylindrical and may have a closed end wall. A pressure responsive relief valve can be in one wall of the casing. There is an aperture in the casing wall for filling the casing with liquid. A plug is inserted in said aperture to seal the liquid with the casing and is retained in the sealed position. The plug at its inner end may be provided with a pair of spaced flanges which engage a notch or opening formed in a lip within the casing to retain the plug in either a shipping or operating position.

Other objects, advantages and features of the invention will become apparent from the accompanying description and drawings, which are merely exemplary.

In the drawings.

Proceeding next to the drawings wherein like reference symbols indicate the same parts throughout the various views, a specific embodiment of the present invention will be described in detail.

Figure 1:
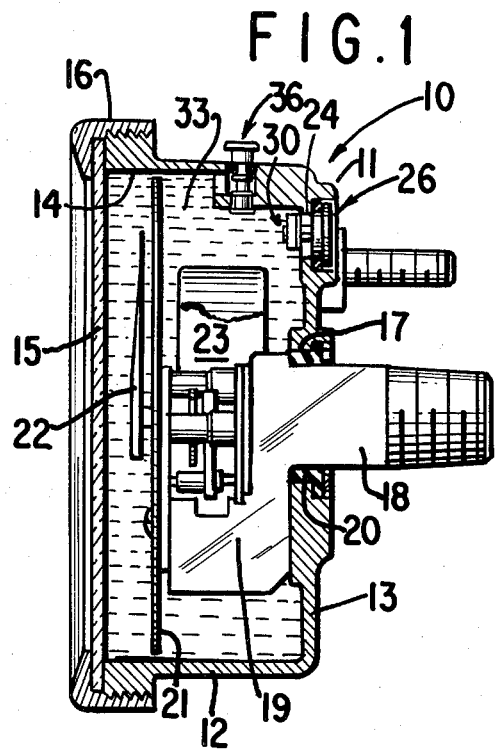
FIG. 1 is a vertical sectional view through a liquid-filled gauge according to the present invention.
Figure 2:
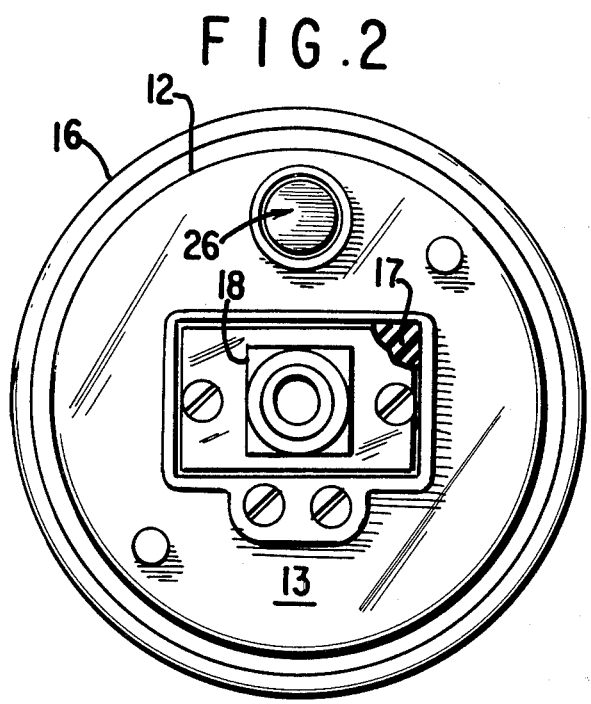
FIG. 2 is a rear elevational view of the gauge of FIG. 1.

As may be seen in FIG. 1, a liquid-filled pressure gauge according to the present invention is indicated generally at 10. The gauge comprises a casing 11 having a cylindrical side wall 12 and a closed end wall 13. The other or open end 14 of the casing is closed by a transparent window or lens 15 of glass or plastic retained in position by ring 16. There is an opening 17 in the rear wall of the casing, and socket 18 of indicator or gauge movement socket assembly 19 extends through this opening and is sealed therein by a gasket or bushing 20. The gauge movement 19 has a dial face 21 mounted thereon in front of which is a pointer 22 attached to an end of a Bourdon tube 23 in a manner known in the art.

Figures 3, 4:
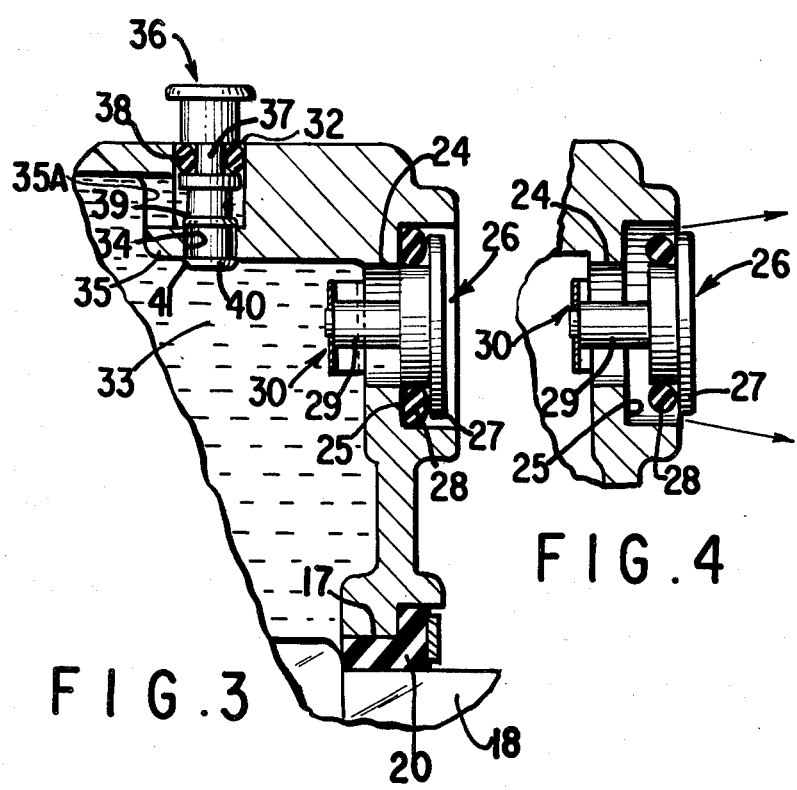
FIG. 3 is a portion of the section of FIG. 1 but in enlarged scale showing the structure of the plug and the relief valve.
FIG. 4 is a portion of the section of FIG. 3 showing the relief valve in the open position.
Figure 5:
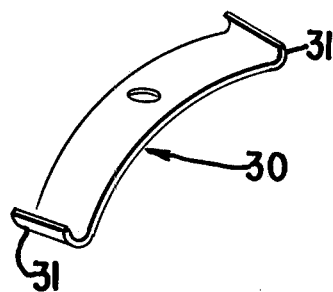
FIG. 5 is a perspective view of the leaf spring for the relief valve.

In the rear wall 13 of the casing, there is an aperture 24 (FIG. 4) having a valve seat 25 therein. Valve 26 has a flanged portion 27 below which is positioned a sealing ring 28 to engage upon the seat 25 when the valve is in the closed position as shown in FIG. 3. The valve is further provided with a stem 29 which passes rearwardly through the opening into the interior of the casing and is connected to the central portion of a bowed leaf spring 30 shown in FIG. 5. The curved ends 31 of the leaf spring engage the inner surface of the casing and wall on either sides of the aperture 24 to retain the valve in the closed position as shown in FIG. 3. The valve member is selected so as to open at a certain predetermined internal pressure.

The side wall 12 of the casing is provided with an opening 32 through which a suitable liquid 33 can be introduced to fill the interior of the casing as shown in FIG. 1. Below the opening 32 and aligned therewith is a second opening 34 formed in a lip 35 integral with an inner surface of the casing as shown in FIG. 3, the lip having a passage 35A communicating with the interior of the gauge.

After the casing has been filled with liquid, the aperture 32 is sealingly closed by means of plug 36, plug 36 being substantially cylindrical and having an annular groove 37 in which is positioned a resilient sealing ring 38 to seal the plug within the aperture 32. At its lower end, the plug 36 is provided with a pair of spaced flanges 39 and 40 with the flange 40 being at the end of the plug and having beveled edges at 41. When the plug is in the sealed position, the flanges 39 and 40 engage opposite edges of the opening 34 as shown in FIG. 3. The plug is inserted into aperture 32 and holds the seal ring 38 in sealing relation thereto to prevent leakage of the liquid either by accident or by someone unknowingly removing the plug.

Figure 6:
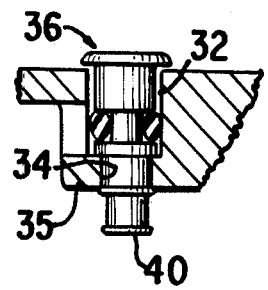
FIG. 6 is a fragmentary view showing the plug valve in an open position.

Since the casing may be made of a plastic or a soft metal, the beveled end 41 of the plug passes through the aperture 32 which is greater in diameter than the diameter of the flanges. However, the opening 34 is smaller in diameter than the outer diameter of the flanges. The beveled end of the plug can be easily forced through the opening into the locking or closed position as shown in FIG. 3. The plug may be made of metal, such as stainless steel, so it can be forced through the opening in a manner as described above. When it is desired to open the valve so as to permit "venting" of the interior of the gauge to atmosphere, the plug is pushed inwardly to an operating or open position as seen in FIG. 6.

Thus, it can be seen that the plug has two positions, namely, the shipping position where the plug projects outwardly of the surface of the casing and the sealing ring is in the aperture 32. The ring is sufficient to seal against the escape of liquid. In the second or operating position, the plug is pushed in which opens the interior of the gauge to the atmosphere. In this position, the upper flange 39 is locked below the edge of the opening 34.

Thus, it can be seen that the present invention has disclosed a liquid-filled gauge which is provided with both a pressure relief valve and a plug secured in either of two positions for retaining liquid within the casing. The plug is simple in structure but can be easily locked in position after the gauge has been filled and will remain in this locked position to prevent any loss of liquid from the gauge until opened. After the gauge is installed, the plug can be opened. The opening 32 can be easily resealed by raising the plug to the position shown in FIG. 3.

It will be understood that changes in various details of construction and arrangement of parts may be made without departing from the spirit of the invention except as defined in the appended claims.

What is claimed is:

1. In a liquid filled pressure gauge, the combination including a casing having a filling aperture therein, plug means inserted in said aperture to seal the liquid within said casing, and axially spaced locking flanges on said plug means lockingly engageable with said filling aperture for retaining said plug means in completely sealed and closed position after gauge installation, with said plug means and the axially spaced locking flanges thereon being manually moved relative to said aperture to completely open locked position for relief venting, and said plug means being manually moved to return said plug means to closed locked position after venting.

2. In a liquid-filled pressure gauge as claimed in claim 1 wherein said lower flange is rounded to be forced through said opening and to engage the lower edge of the opening when the plug is in the shipping position, a portion of the plug protruding above the outer surface of the casing in the shipping position.

3. In a liquid-filled pressure gauge as claimed in claim 1 wherein the plug is inserted completely in said aperture in the operating position and the next lower flange engages the lower edge of the opening.

4. In a liquid-filled pressure gauge as claimed in claim 1 wherein there is a pressure relief valve in said casing, said pressure relief valve serving to relieve pressure from within said casing in the event said plug means is not open or pressure rises above a safe value in said casing.

5. In a liquid-filled pressure gauge as claimed in claim 4 wherein said casing is cylindrical with a closed end wall, and said pressure relief valve is in said end wall and said plug in the cylindrical wall of said casing.

6. In a liquid-filled pressure gauge as claimed in claim 4 and including means in said casing defining a valve seat, said pressure valve comprising a flange valve member and a stem extending into said casing, said valve flange being seated on said valve seat in the closed position, and spring means connected to said valve stem within said casing to urge said valve into the closed position.

7. In a liquid-filled pressure gauge as claimed in claim 6 wherein said spring means comprises a bowed leaf spring.

8. In a liquid-filled pressure gauge as claimed in claim 1 having a casing with an aperture therein, the combination including a pressure relief valve, said valve being insertable into said aperture in the wall of said casing, said valve including a flange member and stem, and spring means connected to said valve stem to urge said valve into closed position.

9. In a liquid-filled pressure gauge as claimed in claim 8 wherein said spring means is a bowed leaf spring.

* * * * *

UNITED STATES PATENT OFFICE
CERTIFICATE OF CORRECTION

PATENT NO. : 3,874,241
DATED : April 1, 1975
INVENTOR(S) : Philip W. Harland and Ralph D. Waite It is certified that error appears in the above-identified patent and that said Letters Patent are hereby corrected as shown below:

Column 4, line 20, after "position" insert --and in a closed position--.

Signed and Sealed this fifth Day of August 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

PATENT NO. : 3,874,241
DATED : April 1, 1975
INVENTOR(S) : Philip W. Harland and Ralph D. Waite It is certified that error appears in the above-identified patent and that said Letters Patent are hereby corrected as shown below:

Column 4, line 20, after "position", cancel

--and in a closed position--, inserted by

Certificate of Correction dated August 5, 1975, and substitute therefor --and in an open position--.

Signed and Sealed this

Thirteenth Day of July 1976

[SEAL]

Attest:

RUTH C. MASON
Attesting Officer

C. MARSHALL DANN
Commissioner of Patents and Trademarks